United States Patent [19]

Grandi

[11] Patent Number: 5,101,714
[45] Date of Patent: Apr. 7, 1992

[54] UNIVERSAL COOKING AND BAKING APPARATUS

[76] Inventor: René Grandi, Loudon-Ruy, F-38300-Bourgoin-Jallieu, France

[21] Appl. No.: 477,895

[22] PCT Filed: Nov. 8, 1988

[86] PCT No.: PCT/FR88/00547
§ 371 Date: Apr. 30, 1990
§ 102(e) Date: Apr. 30, 1990

[87] PCT Pub. No.: WO89/04131
PCT Pub. Date: May 18, 1989

[30] Foreign Application Priority Data
Nov. 9, 1987 [FR] France ............... 87 15613

[51] Int. Cl.[5] .................. A47J 37/00; A47J 37/12
[52] U.S. Cl. ............................ 99/335; 99/330; 99/355; 99/357; 99/404; 99/407; 99/408; 99/409; 99/443 C
[58] Field of Search ......... 99/330, 335, 331, 443 C, 99/403, 404, 407, 409, 408, 472, 357, 355, 325, 470; 126/391; 210/167, DIG. 8

[56] References Cited

U.S. PATENT DOCUMENTS

| | | |
|---|---|---|
| 1,659,415 | 2/1928 | Thomas . |
| 3,097,589 | 7/1963 | Moore ................... 99/408 |
| 3,156,177 | 11/1964 | Sanders . |
| 3,296,954 | 1/1967 | Haub et al. ............ 99/407 |
| 3,648,595 | 3/1972 | Morris ................... 99/408 |
| 3,690,246 | 9/1972 | Guthrie, Sr. ........... 99/407 |
| 3,733,998 | 5/1973 | Vischer, Jr. ........... 99/330 |
| 3,809,777 | 5/1974 | Thompson . |
| 3,928,045 | 12/1975 | Tsunoda et al. ....... 99/357 |
| 4,047,476 | 9/1977 | Liebermann ........... 99/325 |
| 4,064,796 | 12/1977 | Jones . |
| 4,084,492 | 4/1978 | Sullivan . |
| 4,195,667 | 4/1980 | Moore et al. . |
| 4,210,123 | 7/1980 | Moore et al. . |
| 4,210,177 | 7/1980 | Moore et al. . |
| 4,259,567 | 3/1981 | Moore et al. . |
| 4,324,173 | 4/1982 | Moore et al. . |
| 4,420,006 | 12/1983 | Moore et al. . |
| 4,668,390 | 5/1987 | Hurley et al. ......... 210/167 |
| 4,873,920 | 10/1989 | Yang ..................... 99/472 |
| 4,945,893 | 8/1990 | Manchester ........... 126/391 |

FOREIGN PATENT DOCUMENTS

| | | |
|---|---|---|
| 0143066 | 5/1985 | European Pat. Off. . |
| 2050900 | 4/1971 | France . |
| 2374874 | 12/1977 | France . |
| 2564289 | 11/1985 | France . |
| 2564699 | 11/1985 | France . |
| 621821 | 6/1949 | United Kingdom . |
| 829269 | 3/1960 | United Kingdom . |
| 1438907 | 6/1976 | United Kingdom ........ 99/330 |

Primary Examiner—Timothy F. Simone
Attorney, Agent, or Firm—Sandler, Greenblum & Bernstein

[57] ABSTRACT

Universal cooking unit wherein products to be cooked are introduced into a cooking or baking chamber by a drawer. The drawer includes joints to tightly seal the cooking chamber, which can be placed under vacuum, thereby permitting cooking at low temperature. A heating chamber, tightly separated from the cooking chamber, raises the temperature of the liquids, such as oil or water, for cooking the product in the cooking chamber. These liquids are heated by a preferential route fitted with electrical resistors, and are then propelled by a pump through a network of pipes, to the cooking chamber, and sprayed or vaporized on the food. The liquids are then collected on an inclined plane which recycles them to the heating chamber through filters to regenerate and reheat them by the preferential route in order to restart the cooking cycle. To change the cooking mode, a valve is closed and the oil in the container is conveyed by the pump to a reservoir for storage.

27 Claims, 3 Drawing Sheets

UNIVERSAL COOKING AND BAKING APPARATUS

BACKGROUND OF THE INVENTION

1. Field of the Invention

Various apparatus are known which cook or bake with oil or water in an open receptacle covered, at best, by a mere lid. Electrical resistance heaters, to raise the temperature of the components such as oil or water, are present in, the open receptacle inside the cooking enclosure and at different levels.

2. Discussion of Background and Relevant Material

Open receptacles are known, wherein the baskets holding the materials to be cooked or baked are immersed in oil or water using a "rise and lower" mechanism. In this type of apparatus, the power elements for raising the temperature are located underneath the cooking receptacle.

In all known systems, the heating elements for raising the temperature are in the same place as the cooking and baking receptacle, and it is impossible to move or atomize oil into an enclosure sealed less than hermetically because the oil would ignite upon contact with the high temperature of the electric resistances and oxygen.

SUMMARY OF THE INVENTION

The apparatus according to the present invention averts of these drawbacks and renders it possible to cook or bake particular foods with very little oil or water, while being extremely safe. This apparatus comprises an enclosure with a cooking chamber into which the products to be processed shall be introduced, and a heating chamber where oil or water is raised to a higher temperature in order to pass through a network of pipes and a pump to cook those products in the cooking or baking chamber.

This cooking and baking chamber is wholly separate from the heating chamber, and it is hermetically sealed; it may even be at maintained under vacuum, thereby making possible low-temperature cooking. The vapors are recovered in condensers cooled by fins, or by water or air.

This apparatus also allows recovering the oil and storing it in an upper reservoir to allow emptying the machine for cleaning, re-starting, etc., or merely changing the cooking and baking mode, i.e., passing from oil to water without thereby being required to evacuate all the oil, as this oil is stored in the upper reservoir.

Because the substance is returned to the upper reservoir only at the end of cooking or baking, this allows pressure-cleaning of all parts of the cooking enclosure and also the heating chamber and its surroundings without contaminating the oil.

All these operations are controlled by an electric desk coupled to the apparatus, and which by means of a variety of safeguards prevents improper procedures.

This upper reservoir also feeds oil exclusively to the heating chamber and allows maintaining a constant level of this oil during cooking or baking by means of a floater keeping constant the required amount of oil, and continuously controlling the level of this oil which is eliminated during cooking.

Heating elements are mounted in this upper reservoir to melt any special fats being used and which are solid in the cold state, allowing them to descend in liquid form into the heating chamber before following the same preferred heating path for product cooking.

The supplying and the evacuation of the processed products to and from the cooking or baking chamber shall be through motor-driven shutter-gates, with protective flaps and suitable screens, that will seal hermetically to prevent any splashing during the pressurized processing.

This supplying or removal of the products to or from the cooking or baking chamber may be manual or fully automated, and can be achieved by an endless conveyor belt in the case of bulk of agro-foodstuffs. Otherwise, the product treatment shall take place in standard food bins, the bins themselves possibly being packed in shipping crates, with all depths being applicable depending on the model for fitting the cooking or baking chamber.

These basket-bins are moved on a conveyor belt or are merely deposited in a drawer which is next to be inserted into the cooking or baking chamber.

For large-scale cooking or baking and in automation, the baskets will position themselves in the drawer which is hermetically closed along its entire periphery by a suitable seal, with a motor fitted with a gear rack closing the drawer bearing the baskets; this closing also may be carried out manually by actuating a handle and applying pressure.

As regards automation and the gear-rack motor, a compression cam shall press the drawer into its sealed position so that the seal shall be used hermetically. An inflatable seal also may be used.

The moment the baskets have been inserted, a pump at a high pressure of about 60 bars will atomize the oil or vaporize the water, from the heat chamber, into steam or jets, depending on the desired cooking or baking, upon the products in the cooking or baking chamber.

These liquids, having been atomized or vaporized through nozzles, under pressure above, below and even by the walls on the products to be processed, will then return by means of an inclined plane and be regenerated in the heat chamber which is heated along a preferred path so that the liquids that were cooled shall be reheated and superheated and then shall follow the path to the cooking or baking chamber by passing through the pressure pump. The temperatures are monitored at the nozzle exits because in steady state the reheated liquids must be at a constant temperature. The temperatures are regulated in relation to the particular products being cooked.

This vaporization or atomization taking place under pressure in a sealed cooking or baking chamber, lacking air and oxygen, at high temperature, liquids such as oil cannot ignite.

In another combination, vaporization-pressure need not be used as the cooking or baking means, instead a fully conventional way may be employed, that is cooking or baking by immersion in oil or water, projection no longer being pressurized but merely serving to supply the cooking or baking chamber. The return orifice to the heat chamber being closed, the liquid level shall rise and submerge the products to be cooked, an overflow returning the excess to the preferred path of temperature rise of the heat chamber, proceeding with the identical cycle of resupplying the cooking or baking chamber. The nozzles operate similarly, however with a level up to overflow.

Direct evacuation through a disk-valve allows evacuating vapors, passing through the condenser.

As regards specific cooking or baking, for instance for pastry, the purpose of the nozzles is to knead constantly to prevent the pastries from sticking to each other, because manual intervention is impossible. These projecting nozzles provide a genuine churning bath which is highly efficient for the heat exchange during baking or cooking, while also allowing to remove in constrained manner the starches through the overflow which will be recovered by a first filter in the heat chamber. This filter furthermore will retain all wastes, which include vegetable skins.

A second filter, with a different mesh fineness than the first, follows the first to improve filtration.

The cooking or baking chamber also comprises a slow-combustion grill to cook au gratin at the end, thereby allowing to cook in different modes, this applying in particular to smaller-scale kitchens; such as to prepare lamb saute.

The bin is moved through the sealed drawer into the cooking or baking chamber, the slow-combustion grill browns the product, then the drawer is opened to apply or sprinkle flour, whereupon au gratin is slightly continued, and next reopening takes place and then sprinkling with white wine or water or marinade, whereupon everything is covered by the sealed hood, and the drawer is again introduced and cooking or baking takes place in an environment of steam flux (braising-type cooking).

Non-perforated bins shall be used for this kind of cooking, but if it is desired to cook directly in steam flow, perforated bins shall be used. Once the cooking or baking is terminated, steam generation is stopped and the salamander stove is used to brown the meats. In order to directly generate flowing steam in the cooking or baking chamber, resistors are mounted underneath the cooking or baking chamber.

A turbine with which to pulsate air through the salamander stove also may be used in that apparatus, thereby cooking or baking with pulsated air.

The management of all these functions is assumed by electronic controls pre-set on a control chassis.

This system allows arbitrarily setting up modules: two, three or four. Each of these modules may be independent of the others and carry out its own cooking or baking at different durations or times and be provided with its own heat chamber with injection pump; however, several modules also may depend on a single heat chamber that would control several module inputs of cooking or baking chambers.

These special cases may be suitable for agro-foodstuffs in which a single type of product would be cooked in a single duration.

This apparatus would comprise intakes and discharges the same as described above but also would be equipped with a refrigerator and an evaporator to cool the cooked or baked products and then aerated underneath a scaffold.

The two hot and cold systems may be linked, thereby achieving rapid cooking and cooling without a break in the process and cooling the products before they drop below 65° C.

The bins and baskets are identical for cooking and cooling.

BRIEF DESCRIPTION OF THE DRAWINGS

The attached drawings show embodiments of the invention in illustrative but non-limiting manner.

In FIG. 2, the cooking or baking chamber is being loaded.

DETAILED DESCRIPTION OF THE PREFERRED EMBODIMENTS

Figure 1:
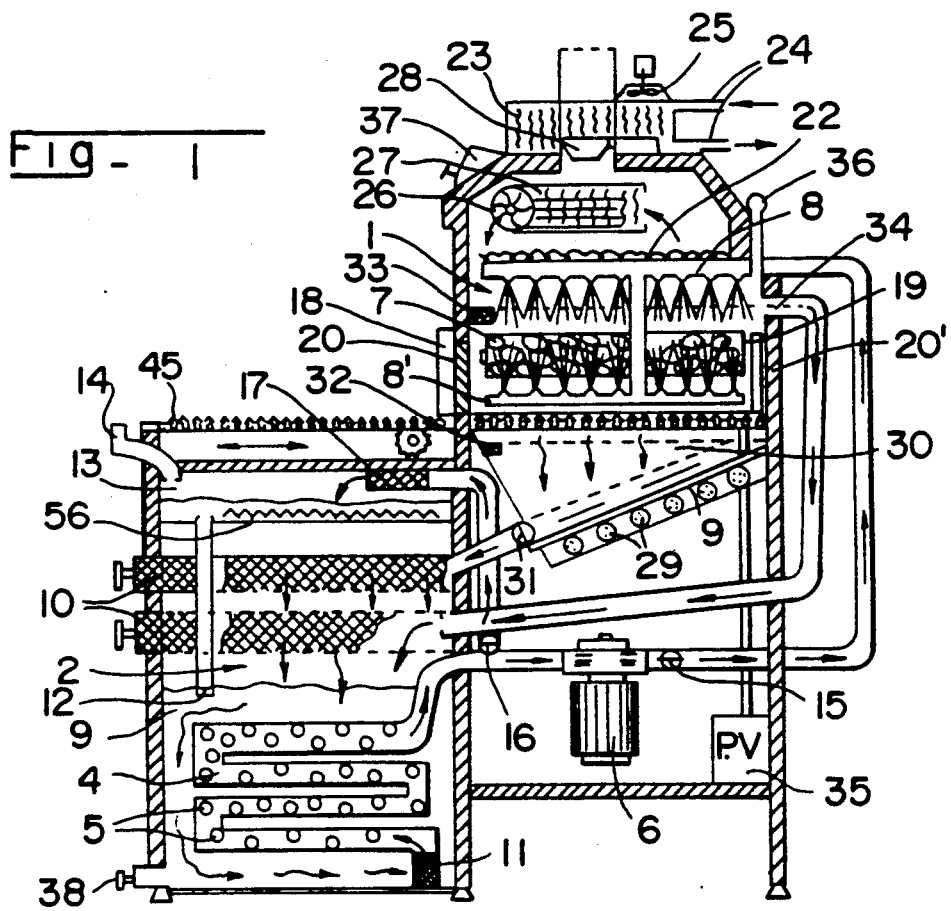
FIG. 1 shows the overall apparatus in section while being used for cooking or baking.
Figure 2:
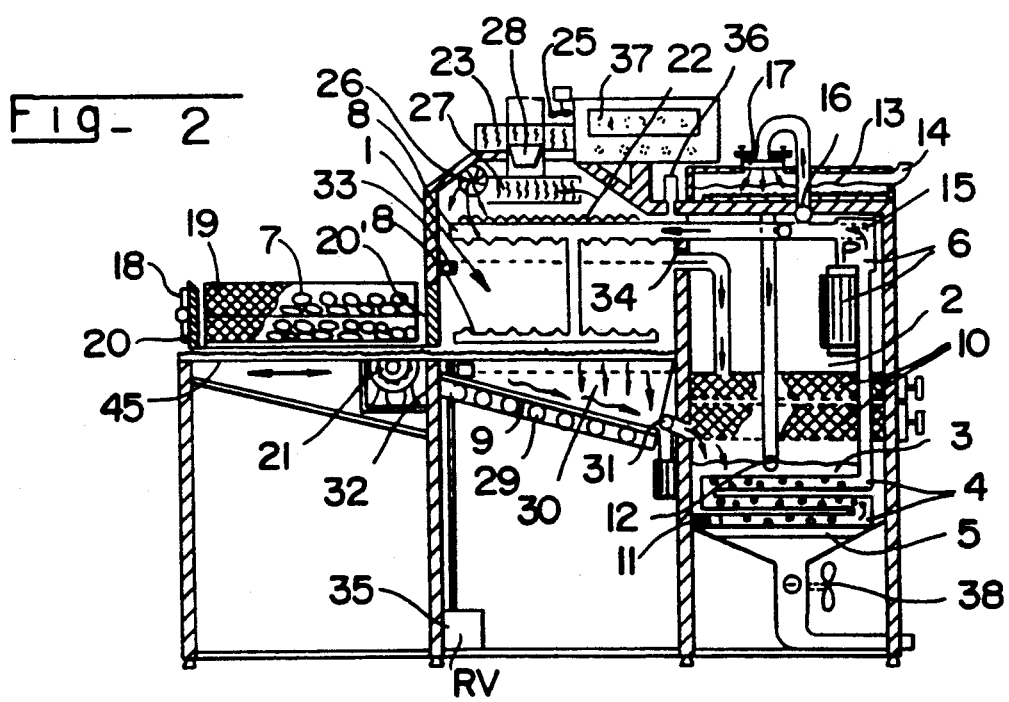
FIG. 2 is a section of the apparatus with a different design for the heating chamber and the cooking or baking chamber, though being equivalent and being provided in illustrative manner.

The apparatus shown in FIGS. 1 and 2 comprises a cooking or baking chamber 1 separate from the heating chamber 2 containing water or oil 3 moving along a preferred path 4 equipped with . electric ovens 5 to be heated. A pump 6 aspirates the liquids to atomize or vaporize them by means of sets of nozzles 8 onto the processed products 7, whereupon the liquids, such as oil or water, are recovered by means of an inclined plane 9 and then pass through filters 10 which can be dismantled and cleaned and have different meshes to improve filtration.

These liquids then recirculate for regeneration and reheating along the preferred path 4 and pass through another filter 11. In the heating chamber 2, the liquids are kept at a constant level 12 from the reservoir 13 itself being filled through the stopper 14.

The reservoir 13 also can recover the oils of the preferred path 4 and in particular store them when it is desired to switch from cooking or baking with oil or steam, or in the event of cleaning or malfunction intervention.

In order to store in the reservoir 13, the valve 15 is closed, whereby the pump 6 cannot convey oil into the cooking or baking chamber, and valve 16 is opened, so that the oil may move into the reservoir 13 while passing through a new filter 17. A heating band 56 permits the melting of any special fats or solid oils being used.

The products to be processed are inserted into a drawer 18 while being in gastronomic bins or baskets 19, and this drawer 18 is equipped with seals 20, 20 ', which may be inflatable, at its two ends seal 20 hermetically closes the chamber during cooking or baking, and seal 20' closes the chamber when loading the drawer 18, thereby preventing steam escaping from the apparatus. These seals may be pressure-closed. A gear-rack 21, which may be motor-driven, allows introducing the drawer 18 into the cooking or baking chamber 1 by means of a roller belt 45. A salamander stove or grill 22 shall brown the products or treat them au gratin, however it will be inoperative during oil propulsion to prevent the oil from igniting.

A water condenser 23 with water intake and outlet 24 or an air condenser 25 with turbine recovers excess steam or condensates.

As regards cooking by pulsated air or with superheated steam, a tangential turbine 26 with a set of electrical resistors 27 allows projecting hot air.

A motor-driven valve 28 thereupon allows closing the condenser 23 or 25, if hermetic operation is required.

For submerged cooking in oil or water or in moving or pressurized steam, electric ovens 29 heat the receptacle 30, while the valve 31, which allows draining from the inclined slope 9, at that time shall be closed.

A float 32 allows keeping low the water level in the steam cooking mode and another float 33 allows keeping the water-level high for submerged cooking, up to the overflow 34.

A pump 35 also allows cooking or baking in vacuum.

A safety valve 36 allows evacuating any air or steam surplus.

All operations are actuated from the control desk 37.

A tap 38 allows total emptying of the apparatus.

Figure 3:
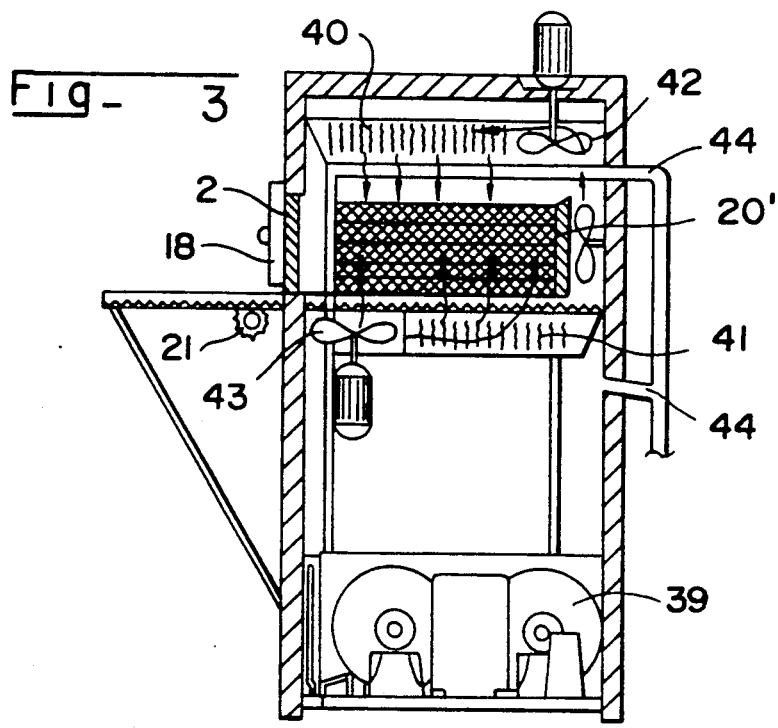
FIG. 3 shows the refrigerating system equipped with evaporators and turbines to cool the product, the loading and discharging taking place identically at the cooking or baking system by means of a sealed drawer.

The apparatus shown in FIG. 3 comprises a compressor 39, vaporizers 40 and 41 with their turbines 42 and 43, and a recovery circuit 44 for the defrosting waters.

The products to be refrigerated also are contained in the drawer equipped with seals 20, 20'.

Again the products are introduced using a motor-driven gear-rack 21.

Figure 4:
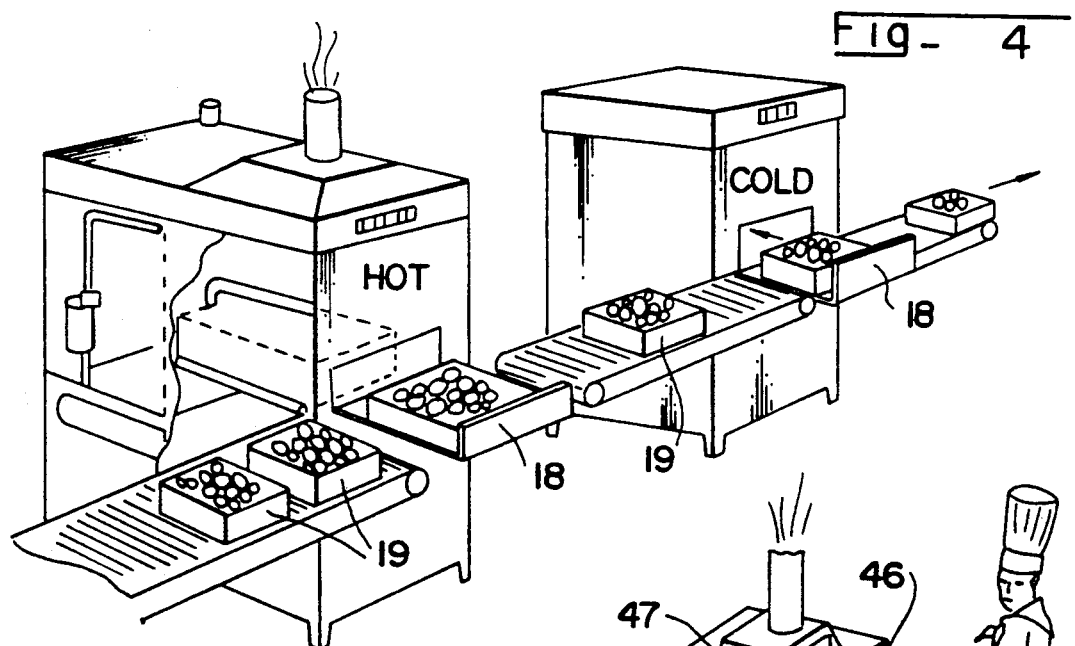
FIG. 4 is a perspective of a cooking and cooling line by means of the apparatus of the invention.

FIG. 4 comprises the above described cooking or baking and refrigeration systems with product baskets 19 introduced into the drawer 18, the entire installation providing a continuous processing sequence for the products.

Figure 5:
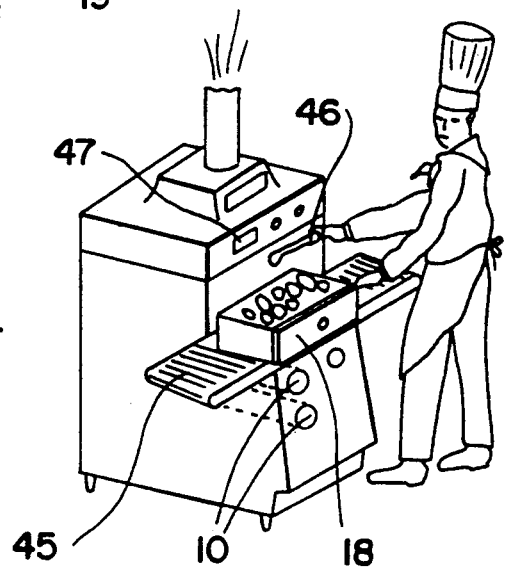
FIG. 5 is an external perspective of a smaller apparatus with manual advance and insertion of the drawer.

The apparatus shown in FIG. 5 comprises a drawer 18 advanced manually on a roller belt. The handle 46 ensures hermetic closing and opening.

The filters 10 are easily accessible in order to clean them.

A timing mechanism 47 is used to program this small apparatus.

Figure 6:
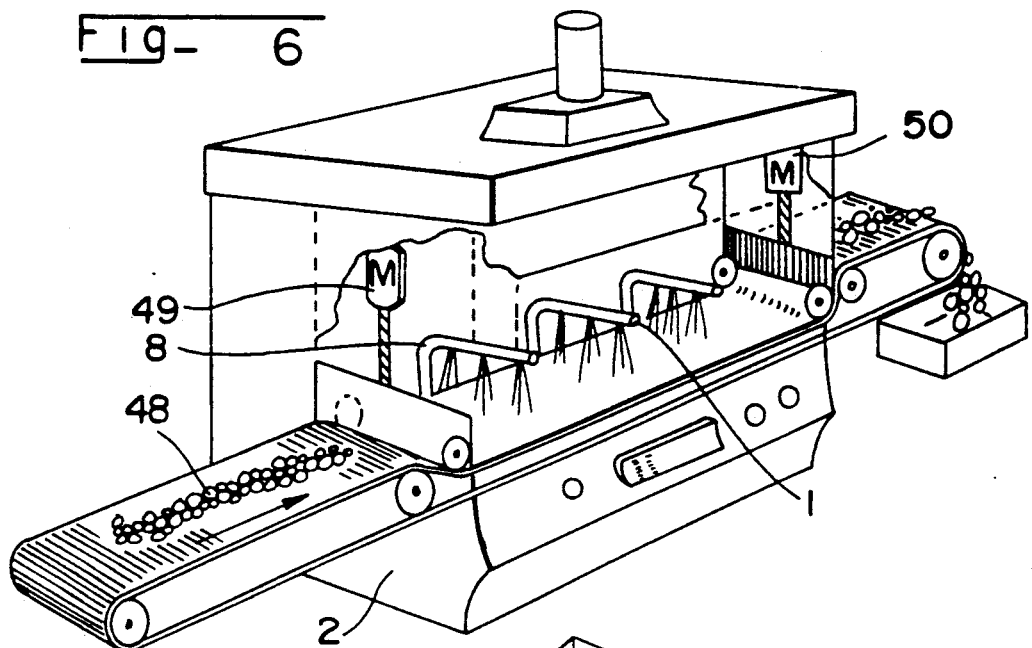
FIG. 6 is a perspective of a large apparatus for continuous or step-wise cooking or baking of bulk products.

The apparatus shown in FIG. 6 comprises a belt 48 driven by motors 49, 50, and is used for continuous and bulk cooking or baking. Sets of nozzles 8 are provided to atomize or vaporize liquids into the cooking or baking chamber 1, and the heating chamber 2.

Figure 7:
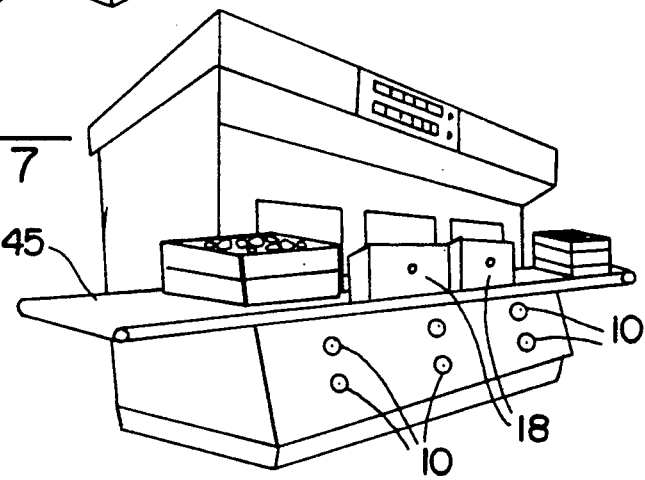
FIG. 7 is a perspective of an embodiment of the apparatus which here is automated and comprises several insertion drawers.

The apparatus shown in FIG. 7 comprises a roller belt 45, several drawers 18, and the filters 10. This is a large-scale cooking or baking apparatus.

Figure 8:
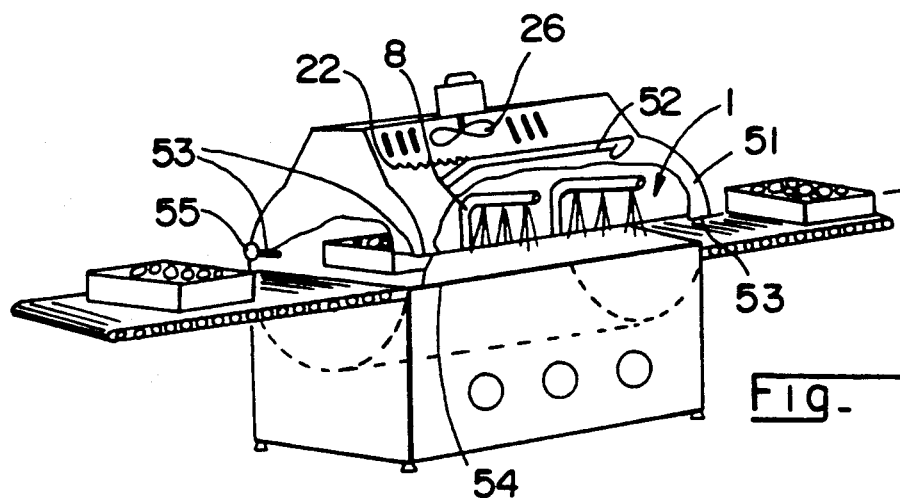
FIG. 8 is a perspective of another embodiment of the apparatus with an upper hood which is manually opened to insert and remove the processed products.

The apparatus shown in FIG. 8 comprises a hood 51 actuated from a handle 52 and closing in hermetic manner by means of seals 53, 54 identical with those of FIG. 1. The apparatus further includes a cooking or baking chamber 1 and the sets of nozzles 8, also the salamander stove 22 and the turbine 26.

Actuators 55 assist the opening and closing motions of the hood 51.

All the shapes, dimensions and means resorted to in the embodiment of the apparatus of the invention and described above may be made to vary within the limits of equivalency.

I claim:

1. A cooking apparatus for heating products by submersion in a heated liquid, or atomization of pressurized oil, water or steam, with continuous filtering and cooling at the end of a heating cycle, said apparatus comprising:
   at least two chambers for separately cooking the products and for heating a liquid substance used to cook the products;
   one of said at least two chambers comprising a heating chamber which includes means for raising the temperature of the liquid substance used to cook the products in a cooking chamber, said means for raising the temperature including a path for circulation of liquid substance, which path contains heating elements;
   another of said at least tow chambers comprising a cooking chamber for processing of the products with heated liquid substance from said heating chamber;
   a reservoir for storage of liquid substance when changing from on liquid substance to another; and
   said means for raising the temperature of the liquid substance being positioned in said heating chamber whereby contact between said liquid substance during cooking of the products is prevented to avoid igniting of the liquid substance.

2. A cooking apparatus for heating products by submersion in a heated liquid, or atomization of pressurized oil, water or steam, with continuous filtering and cooling at the end of a heating cycle, said apparatus comprising:
   at least two chambers for separately cooking the products and for heating a liquid substance used to cook the products;
   one of said at least two chambers comprising a heating chamber which includes means for raising the temperature of the liquid substance used to cook the products in a cooking chamber;
   another of said at least two chambers comprising a cooking chamber for processing of the products with heated liquid substance from said heating chamber;
   said means for raising the temperature of the liquid substance being positioned in said heating chamber whereby contact between said liquid substance during cooking of the products is prevented to avoid igniting of the liquid substance; and
   a salamander grill located in said cooking chamber which is used to prepare food au gratin, said salamander grill being inoperative during oil atomization to prevent ignition.

3. A cooking apparatus for heating products by submersion in a heated liquid, or atomization of pressurized oil, water or steam, with continuous filtering and cooling at the end of a heating cycle, said apparatus comprising:
   at least two chambers for separately cooking the products and for heating a liquid substance used to cook the products;
   one of said at least two chambers comprising a heating chamber which includes means for raising the temperature of the liquid substance used to cook the products in a cooking chamber;
   another of said at least two chambers comprising a cooking chamber for processing of the products with heated liquid substance from said heating chamber;
   said means for raising the temperature of the liquid substance being positioned in said heating chamber whereby contact between said liquid substance during cooking of the products is prevented to avoid igniting of the liquid substance; and means for cooling cooked products comprising a refrigeration chamber, and including a drawer having seals to achieve hermetic closing of said refrigeration chamber.

4. A cooking apparatus for heating products by submersion in a heated liquid, or atomization of pressurized oil, water or steam, with continuous filtering and cooling at the end of a heating cycle, said apparatus comprising:

at least two chambers for separately cooking the products and for heating a liquid substance used to cook the products;

one of said at least two chambers comprising a heating chamber which includes means for raising the temperature of the liquid substance used to cook the products in a cooking chamber;

another of said at lest two chambers comprising a cooking chamber for processing of the products with heated liquid substance from said heating chamber;

said means for raising the temperature of the liquid substance being positioned in said heating chamber whereby contact between said liquid substance during cooking of the products is prevented to avoid igniting of the liquid substance; and drawer means for inserting or removing baskets containing the products, said drawer means including seal means for achieving hermetic sealing of the cooking chamber.

5. The apparatus according to claim 1, further including a pump for flowing heated liquid substance from said heating chamber to said cooking chamber.

6. The apparatus according to claim 5, further including a set of nozzles for atomizing or vaporizing said heated liquid substance over the products to be cooked in the cooking chamber.

7. The apparatus according to claim 6, further including a receptacle having an inclined plane for returning liquid substance after passing through said set of nozzles over the products to said heating chamber.

8. The apparatus according to claim 7, wherein said receptacle includes a valve for controlling flow of liquid substance to said heating chamber.

9. The apparatus according to claim 8, further including means for filtering liquid substance being returned to said heating chamber.

10. The apparatus according to claim 1, further including valve means for controlling the flow of liquid substance to and from said reservoir.

11. The apparatus according to claim 10, wherein said valve means permit flow of liquid substance to said path.

12. The apparatus according to claim 1, further including means for heating said reservoir to permit the melting of solidified oil or special fats.

13. The apparatus according to claim 11, further including means for heating said reservoir to permit the melting of solidified oil or special fats.

14. The apparatus according to claim 1, wherein the products are cooked by submersion in liquid substance within said cooking chamber, and including nozzle means within said cooking chamber for propelling heating liquid substance to agitate the products to prevent their adhering to each other so as to enhance heat exchange.

15. The apparatus according to claim 14, wherein said cooking chamber si hermetically sealed.

16. The apparatus according to claim 14, further including an overflow for decanting excess liquid substance together with starches and skins from products.

17. The apparatus according to claim 16, wherein said overflow is connected to said path.

18. The apparatus according to claim 17, further including means for filtering within said overflow.

19. The apparatus according to claim 1, further including a salamander grill located in said cooking chamber which is used to prepare food au gratin, said salamander grill being inoperative during oil atomization to prevent ignition.

20. The apparatus according to claim 1, further including means for cooling cooked products.

21. The apparatus according to claim 20, wherein said means for cooling includes a refrigeration chamber, and includes a drawer having seals to achieve hermetic closing of said refrigeration chamber.

22. The apparatus according to claim 3, further including a roller belt for feeding said drawer to said refrigeration chamber, and said seals include a seal at a bottom portion of the drawer for preventing cold from escaping during feeding of the drawer to the refrigeration chamber by said roller belt.

23. The apparatus according to claim 3, wherein said means for cooling is sufficient to cool the products in less than two hours.

24. The apparatus according to claim 1, further including drawer means for inserting or removing baskets containing the products, said drawer means including seal means for achieving hermetic sealing of the cooking chamber.

25. The apparatus according to claim 4, further including a roller belt for feeding said drawer means to said cooking chamber, and said seal means include a seal at a bottom portion of the drawers means for preventing steam from escaping during feeding of the drawer means to the cooking chamber by said roller belt.

26. The apparatus according to claim 1, further including pump means for drawing a vacuum in said cooking chamber whereby products may be cooked at low temperatures.

27. The apparatus according to claim 7, further including pump means for drawing a vacuum in said cooking chamber whereby products may be cooked at low temperatures.

* * * * *